United States Patent [19]
Presenz et al.

[11] Patent Number: 5,663,229
[45] Date of Patent: Sep. 2, 1997

[54] TERNARY POLYMER MIXTURE AND ITS USE

[75] Inventors: Ulrich Presenz, Trin; Manfred Hewel, Rodels, both of Switzerland

[73] Assignee: EMS-Inventa AG, Zurich, Switzerland

[21] Appl. No.: 216,877

[22] Filed: Mar. 24, 1994

[30] Foreign Application Priority Data

Mar. 24, 1993 [DE] Germany ............................ 43 09 535.6
Mar. 8, 1994 [DE] Germany ............................ 44 07 712.2

[51] Int. Cl.$^6$ ............................... C08K 5/04; C08K 5/09
[52] U.S. Cl. ..................... 524/399; 524/487; 524/504; 525/66; 525/179; 525/183; 206/524.3
[58] Field of Search .............................. 524/399, 487, 524/504; 206/524.3; 525/66, 179, 183

[56] References Cited

U.S. PATENT DOCUMENTS

| | | |
|---|---|---|
| 3,373,222 | 3/1968 | Armstrong. |
| 4,346,194 | 8/1982 | Roura. |
| 4,410,482 | 10/1983 | Subramanian. |
| 5,162,422 | 11/1992 | Lausberg et al. ........................ 524/504 |

FOREIGN PATENT DOCUMENTS

| | | |
|---|---|---|
| 0 261 748 | 3/1988 | European Pat. Off. . |
| 0 315 451 | 5/1989 | European Pat. Off. . |
| 0 337 153 | 10/1989 | European Pat. Off. . |
| 0 346 148 | 12/1989 | European Pat. Off. . |
| 0 346 149 | 12/1989 | European Pat. Off. . |
| 0 397 531 | 11/1990 | European Pat. Off. . |
| 0 519 248 | 12/1992 | European Pat. Off. . |
| 27 22 270 | 12/1977 | Germany . |
| 40 29964 | 4/1991 | Germany . |
| 40 10958 | 10/1991 | Germany . |
| 41 31 908 | 4/1993 | Germany . |
| 57-200448 | 12/1982 | Japan . |
| 2 226 035 | 6/1990 | United Kingdom . |

OTHER PUBLICATIONS

European Search Report (Apr. 19, 1995).
*Kirk-Othmer Encyclopedia of Chemical Technology*, Fourth Edition, vol. 8, pp. 978–980.
Quhadi, T., et al. "Low gas permeable thermoplastic elastomers," *Popular Plastics & Packaging*, vol. 38, pp. 51–53 (1993).

Primary Examiner—Kriellion S. Morgan
Attorney, Agent, or Firm—Spencer & Frank

[57] ABSTRACT

A polyamide-containing polymer mixture having a melt viscosity of 1,000 to 1,400 Pa·s (at 270° C. and under a load of 122.6 N) and includes the following components:

(A) 50 to 75 parts by weight of polyamide 6, polyamide 6,6, polyamide 12 or mixtures thereof;

(B) 15 to 30 parts by weight of a polyolefin having a density of 0.921 to 0.96 g/cm$^3$ onto which an unsaturated carboxylic acid or an unsaturated carboxylic acid derivative has been grafted, the degree of grafting being between 0.01 and 1 weight percent, with respect to the total weigh of grafted and ungrafted polyolefin;

(C) 10 to 20 parts by weight of a grafted polyolefin elastomer including at least ethylene and propylene units;

(D) Additives selected from the group including stabilizers, anti-friction agents and fillers, with the sum of the parts by weight of components (A) to (D) being 100, and the mixture being produced by mixing components (A), (B) and (D) or (A), (B), (C) and (D) and extruding them at 150 to 300 rpm.

The invention further relates to a shaped object that can be produced by means of injection molding, extruding, coextruding, blow molding or reshaping with the use of said polymer mixture having components (A) through (D).

20 Claims, 1 Drawing Sheet

TERNARY POLYMER MIXTURE AND ITS USE

CROSS REFERENCE TO RELATED APPLICATIONS

This application claims the priority of applications Nos. P 43 09 535.6, filed Mar. 24, 1993, and P 44 07 712.2, filed Mar. 8, 1994, in Germany, the contents of both of which are incorporated herein by reference.

BACKGROUND OF THE INVENTION

1. Field of the Invention

The present invention relates to a polyamide containing polymer mixture having a specific property profile and comprising a polyamide, a high density polyolefin onto at least part of which an unsaturated carboxylic acid or an unsaturated carboxylic acid derivative has been grafted, and a grafted polyolefin elastomer containing, among others, ethylene and propylene as monomer units, and wherein the mixture has a melt viscosity of from about 1,000 to about 1,400 Pa·s at 270° C. and under a load of 122.6 N. The invention further relates to the use of this mixture for the production of shaped objects, particularly by injection molding, extrusion, co-extrusion, blow molding or reshaping. The present invention further relates to a blow molded shaped bag comprising the above mixture, and useful as the inner layer of a container comprising an outer layer and an inner layer with a propellant disposed therebetween as well as a valve, and to a container containing such a molded shaped bag.

2. Technology Background

U.S. Pat. No. 3,373,222 claims a blend of polyolefin and polyamide including a special carboxylized polyethylene as compatibility enhancer. The drawback here is the relatively low effectiveness of the compatibility enhancer which results in poor mechanical properties. The barrier characteristics of such a blend are also poor.

DE 2,722,270.A discloses a binary mixture having a high melt viscosity of polyamide and modified polyethylene, with the mole equivalents of their active groups having to meet a specific stoichiometry in order to be able to solve the respective problem, namely to increase impact strength.

U.S. Pat. No. 4,410,482 discloses a special process for producing a shaped object in which two-dimensional, parallel extending mutually overlapping layers of a polycondensate are present in a polyolefin matrix. This very special structure is intended to improve the mechanical properties as well as the barrier properties.

DE 4,029,964.A1 claims a large-size container composed of a laminate of two to three layers, with one layer being formed of a modified polyamide in the form of a binary blend of polyamide and a grafted polyolefin, while the remaining layers are constructed of a grafted polyethylene. The drawback is the high rigidity of this laminate, since multi-layer structures reduce flexibility.

DE 4,010,958.A1 discloses a stretched, shrinkable tubular sheet of a binary blend of polyamide and acid-modified polyolefin for the production of a sausage skin which has an improved barrier effect and an improved delamination behavior. The drawback is here that a copolyolefin containing an α,β-unsaturated carboxylic acid as the comonomer must be employed as the compatibility enhancer.

U.S. Pat. No. 4,346,194 discloses a blend of nylon 6, nylon 6,6 and grafted EPDM having an improved impact strength at low temperatures. This blend exhibits only limited effectiveness as a barrier material. Moreover, due to the double bonds in the EPDM, its stability against heat and/or light influences is low.

EP 0,397,531.A1 claims a binary blend of an aromatic polyamide and a grafted polyolefin which must have a specific degree of crystallinity and a specific glass transition temperature. Such a blend permits the production of very rigid shaped bodies having a high resistance to deformation due to heat.

EP 0,519,248.A1 describes thermoplastic molding materials on a basis of partly aromatic copolyamides and polyolefins that are distinguished by good impact strength and increased processing stability. The polypropylene used as component (B) is very rigid and exhibits a tension-E module of approximately 1800 N/mm². It additionally has poor barrier characteristics in comparison to hydrocarbons such as HD polyethylene. Bonding agents such as Polybond®, Hostamont®, Admer®, etc. are used as component (C) in EP 0,519,248.A1. EP or EPDM, which are very sensitive to the effects of heat and light because of the included double bonds, are used as caoutchoucs to increase the impact strengths of the described polyamides. The melt viscosity of the formulation is too high for these to be used in the production of special molded objects.

The objective of DE 4,131,908.A1 is to make available formulations having the lowest possible melt viscosity and the highest possible E module for molded parts with improved homogeneity. A melt index of less than 1.5 g/10 min. when measured at 190° C., 2.16 kg, is desired; this corresponds to a capillary melt viscosity of >100 Pa·s at 285° C. and 1000 s$^{-1}$. The acid-modified olefin has a melt index between 50 and 150 g/10 min. when measured at 190° C., 2.16 kg. In particular, the modified polyethylene has a melt index of less than 5 g/10 min. when measured at 290° C., 2.6 kg. Thus, the polypropylene used in this instance is again too rigid. EPDM, which is very sensitive to the effect of heat and/or light because of the contained double bonds, is used as an impact-strength modifier.

EP 0,346,148.A2 is intended to create a polyamide mixture with improved low-temperature viscosity, good flow and good adherence to a surface coating. The polyethylene used in this instance has low viscosity and a melt index from 1 to 30 g/10 min. (190° C.). The polypropylene is rigid and exhibits a low impact value. Again, EPDM caoutchouc is used as an impact-strength modifier. Table 1 of this document shows that high rigidity is desired.

EP 0,261,748.A2 describes a new impact-strength modifier, namely a special block copolymer, and a method for producing it. The block copolymer containing styrene has a poor barrier effect against water. The poly-α-olefin used is characterized by a melt viscosity of approximately 100 to 5000 cp. (1 to 50 Pa·s).

EP 0,337,153.A2 describes polyamide blends for fuel lines in automobiles. These lines should possess the following properties: low-temperature impact strength, salt resistance and barrier characteristics against gasoline and alcohol. Also in this case, EPDM and LD-EP are used, which have poor barrier characteristics. The blends in EP 0,337,153 have a very high melt viscosity.

The materials described in EP 0,519,248.A1, DE 4,131,908.A1, EP 337,153.A2 and EP 0,261,748.A2 are intended for different requirement profiles; in most cases, a very rigid product is desired. The melt viscosities are either very low or too high.

It has therefore been an object of the present invention to make available a polymer mixture having a very specific property profile which will ensure the optimum balance between mechanical characteristics and barrier effect. This property profile includes the following requirements:
* high flexibility without prior conditioning steps;
* good impact strength at room temperature;
* high barrier effect against solvents, particularly water, alcohols and alkanes;
* meeting the high demands of a blow molding process;
* good workability and machinability;
* employing an easily engineered and economical process for imparting compatibility.

In addition, as a special use, a blow molded component produced from this mixture is to be a component of a special container in which a propellant is unable to escape together with the useful product.

These objectives are accomplished by the polyamide-containing polymer mixture according to the invention.

SUMMARY OF THE INVENTION

The objects of the invention are accomplished by a ternary polymer mixture having a melt viscosity of from about 1,000 to about 1,400 Pa·s, preferably 1,000 to 1,200 Pa·s, most preferably 1,000 Pa·s at 270° C. and 122.6 N, the mixture comprising the following components:
(A) 50 to 75 parts by weight of polyamide 6, polyamide 6,6, polyamide 12 or mixtures thereof;
(B) 15 to 30 parts by weight of a polyolefin onto which an unsaturated carboxylic acid or an unsaturated carboxylic acid derivative has been grafted and which has a density from about 0.921 to about 0.96 g/cm$^3$, the extent of grafting being between about 0.01 and about 1 weight percent with respect to the total weight of grafted and non-grafted polyolefin;
(C) 10 to 20 parts by weight of a grafted polyolefin elastomer which includes, among others, ethylene and propylene units, and
(D) additives selected from the group consisting of stabilizers, anti-friction agents and fillers,
with the sum of the parts by weight of components (A) through (D) being 100, and the mixture being produced by mixing components (A), (B), and (D) or (A), (B), (C) and (D) and extruding them at from about 150 to about 300 rpm, preferably from 275 to 300 rpm.

DETAILED DESCRIPTION OF THE INVENTION

Figure 1:
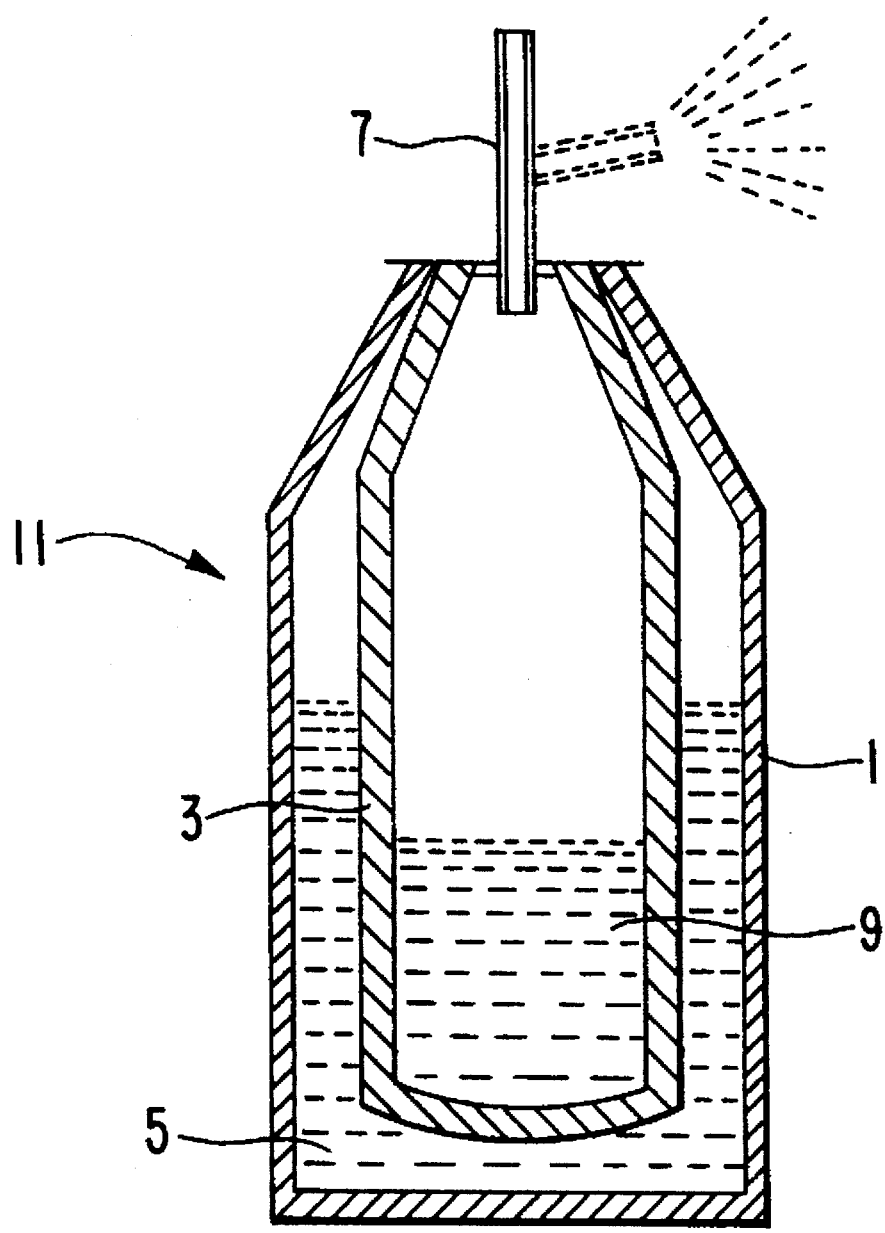
FIG. 1 depicts one embodiment of a container according to the invention.

It was found that specially matched mixture components and a certain melt viscosity of the mixture are necessary to realize the desired property profile. The optimum balance between impact strength and flexibility, on the one hand, and barrier characteristics, on the other hand, linked with good processibility and machinability is realized according to the present invention by a ternary polymer mixture that has a narrow melt viscosity range and must absolutely include two differently modified polyolefins and a polyamide. A ternary polymer mixture according to the present invention has a melt viscosity of 1,000 to 1,400 Pa·s, preferably 1,000 to 1,200 Pa·s, most preferably 1,000 Pa·s at 270° C. and 122.6 N, and includes the following components:
(A) 50 to 75 parts by weight of polyamide 6, polyamide 6,6, polyamide 12 or mixtures thereof;
(B) 15 to 30 parts by weight of a polyolefin onto which an unsaturated carboxylic acid or an unsaturated carboxylic acid derivative has been grafted and which has a density from about 0.921 to about 0.96 g/cm$^3$, the extent of grafting being between about 0.01 and about 1 weight percent with respect to the total weight of grafted and non-grafted polyolefin;
(C) 10 to 20 parts by weight of a grafted polyolefin elastomer which includes, among others, ethylene and propylene units,
(D) additives selected from the group including stabilizers, anti-friction agents and fillers,
with the sum of the parts by weight of components (A) through (D) being 100, and the mixture being produced by mixing components (A), (B), and (D) or (A), (B), (C) and (D) and extruding them at extruding rpm's from about 150 to about 300 rpm, preferably from 275 to 300 rpm.

The ternary polymer mixture according to the invention can include as an anti-friction agent at least one from the group of stearates comprising zinc stearate, aluminum tristearate and stearyl stearate. A polyethylene wax, preferably an oxidized polyethylene wax of high molecular weight, can possibly also be used. The anti-friction agent is used in a quantity from about 0.5 to about 1.5 weight percent, preferably 0.5 to 1.0 weight percent. In a preferred embodiment, 0.5 to 1.0 weight percent of a stearate is used, preferably from the group including zinc stearate, aluminum tristearate, stearyl stearate, and from 0 to about 0.5 weight percent of polyethylene wax, particularly oxidized polyethylene wax, most preferably oxidized polyethylene wax of high molecular weight.

The melt viscosity specified in accordance with the invention, from 1000 to 1400 Pa·s, particularly from 1000 to 1200 Pa·s, can only be achieved by the use of the anti-friction agent of the invention, the correct degree of grafting of component (B) and special extrusion parameters. With regard to the anti-friction agent, in a preferred embodiment the above-described combination from the group including stearates and polyethylene waxes is used in the given quantities. The degree of grafting of component (B), that is, the ratio of carboxylic acid or carboxylic acid derivative to polyolefin or polyethylene, is between about 0.01 and about 1.0 weight percent, preferably between 0.025 and 0.5 weight percent, and most preferably between 0.09 and 0.2 weight percent with respect to the total weight of polyolefin or polyethylene (grafted and ungrafted).

In order to achieve the melt viscosity of the invention from 1000 to 1400 Pa·s, the highest possible extruding rpm, particularly from about 275 to about 300 rpm, must additionally be used.

In a preferred embodiment, the polymer mixture according to the present invention includes 60 to 65 parts by weight of component (A), 20 to 35 parts by weight of component (B) and 15 to 20 parts by weight of component (C).

The polyamide mixture component, which is preferably nylon 6 or nylon 6,6 , has a relative viscosity of from about 3 to about 5.5 dl/g, preferably 3 to 4.5 dl/g, and most preferably 3.5 to 3.8 dl/g, with these viscosity values being measured at 23° C. in a 1% polymer solution in 98% sulfuric acid.

The polyolefin employed as component (B) must be selected in such a way that its melt viscosity harmonizes with that of the polyamide employed as component (A). The polyethylene here preferably employed as the polyolefin has a melt flow index (MFI) according to DIN 53735 [German Industrial Standard] 53735 or ISO 1133 of about 1 to about 20 g/10 min, preferably 5 to 15 g/10 min, most preferably 5 to 10 g/10 min (at 190° C. and 21.6 kg). Determinative for the barrier effect is the density of the polyethylene which should be from about 0.92 to about 0.96 g/cm³. For special uses a density range from 0.94 to 0.95 g/cm³ is advantageous.

In order to increase the compatibility between components (A) and (B), an unsaturated carboxylic acid or an unsaturated carboxylic acid derivative, such as an acid anhydride, is grafted onto part of component (B). Preferably, at least about 40 weight percent of the polyolefin are functionalized or grafted in this way. For special applications it is advantageous to graft up to 100 weight percent of component (B).

The compatibility enhancement by way of grafting according to the present invention is much simpler and more economical from a process engineering point of view than the use of copolyolefins into which α,β-unsaturated carboxylic acids were polymerized. Particularly the polyolefins grafted with acid anhydride groups exhibit an increased efficiency in compatibility enhancement compared to those grafted with carboxyl groups. In addition to the particularly advantageous maleic acid anhydride which is employed, with respect to the polyolefin percentage, in quantities of about 0.01 to about 1 weight percent, preferably 0.05 to 0.5 weight percent, most preferably 0.1 to 0.2 weight percent, other unsaturated carboxylic acids or carboxylic acid derivatives are also suitable as grafting agents according to the present invention. For example, maleic acid, itaconic acid, acrylic acid, methacrylic acid, fumaric acid, citraconic acid, mesaconic acid, maleic acid anhydride, itaconic acid anhydride, citraconic acid anhydride, dimethyl maleate, dipropyl maleate, diisobutyl maleate, dicyclopentyl maleate, dihexyl maleate, dibenzyl maleate, phenyl ethyl maleate are suitable as grafting agents.

The grafting reaction takes place according to known processes in which the polyolefin, the unsaturated carboxylic acid or its derivative and a radical former such as, for example, a peroxide, are mixed and the mixture is extruded while the grafting reaction is taking place. The quantity of unsaturated carboxylic acid or unsaturated carboxylic acid derivative employed with respect to the polyolefin percentage lies in a range from about 0.01 to about 1.0 weight percent, preferably 0.05 to 0.5 weight percent, most preferably 0.09 to 0.2 weight percent.

In order to ensure proper further processing of a shaped object according to the present invention without prior conditioning, component (C), which is a functionalized polyolefin elastomer that comprises ethylene and propylene units, is required. Component (C) is functionalized with the same reagents as component (B). Elastomers suitable for use as component (C) include, for example, those having ethylene and propylene units as major components and as minor component an α-olefin selected from the α-olefins having 3 to 12 carbon atoms, for example, 1-butene, 1-pentene, 1-hexene, 1-octene or 4-methyl-1-pentene. For special applications, a grafted polyolefin elastomer of ethylene, propylene and butene-1 units has been found to be very satisfactory.

A process for producing ternary polymer mixtures according to the invention includes the following partial steps in one pass through the extruder:
(a) grafting the polyolefin in the first section of an extruder; and
(b) melt compounding the grafted polyolefin (without prior isolation) in the second section of the extruder together with the polyamide and the polyolefin elastomers which are supplied through a lateral extruder,
with additives possibly being added at a suitable location.

Another process for producing the polymer mixtures according to the present invention is a multi-step, discontinuous process. In the first step, the polyolefin is grafted in a melt extrusion process, then granulated and dried. In the second step, this granulate is mixed with a granulate of the polyamide and the polyolefin elastomers, with the desired additives possibly being added as well at this point. In a last step, the mixture is compounded by extrusion with subsequent granulation and drying.

In another multi-step process for producing the polymer mixtures according to the invention, components (A), (B) and (D) are mixed to form a pre-mixture, and this pre-mixture is extruded to form an extrudate. The extrusion step may be carried out at from about 150 to about 300 rpm, in particular from about 275 to 300 rpm. Subsequently, component (C) is mixed into, or with granulate of, the extrudate and this final mixture under the invention may then be extruded at from about 150 to about 300 rpm, in particular from about 275 to about 300 rpm.

Ternary polymer mixtures according to the invention are employed for the production of shaped objects having the above-described property profile.

Suitable methods for this purpose are injection molding, extruding, coextruding, blow molding and reshaping. For one specific application, the blow molding process is particularly preferred.

A special use for blow molded bags produced from the polymer mixture according to the invention is as the inner layer in containers equipped with an outer layer and an inner layer between which a propellant is disposed and with a valve. A special embodiment of this type is found, for example, in spray cans which do not discharge a propellant to the environment. Such spray cans include the flexible polymer bag according to the invention in a metal can, and the propellant is disposed in the space between this shaped bag and the metal wall. Due to the pressure exerted by the propellant, the useful product is released when the valve is opened.

FIG. 1 depicts one embodiment of a container 11 according to the invention. The container has an outer layer 1 and an inner layer 3 between which is disposed a propellant 5. The inner layer 3 comprises a molded bag according to the invention, and has a desired product 9 within it. The container additionally has a valve 7 in communication with the interior of the inner layer 3 for permitting the release of the desired product 9 from the container 11.

A particular advantage of the invention is that the shaped bag made of the polymer mixture according to the invention can be made so flexible and impact resistant without prior conditioning that it is not destroyed when pushed into the metal can. Moreover, due to its barrier effect with respect to solvents, particularly water, alcohols and alkanes, it is possible to employ various propellants and useful products.

According to the invention, the propellant is selected from the group of alkanes having three to five carbon atoms, preferably propane, butane or pentane and their isomers, or mixtures thereof.

The present invention thus also relates to a container comprising an outer layer and an inner layer between which a propellant is disposed, and a valve, with the inner layer being a shaped bag produced by blow molding a ternary polymer mixture that has a melt viscosity of 1,000 to 1,400 Pa·s at 270° C. and 122.6 N and includes the following components:

(A) 50 to 75 parts by weight of polyamide 6, polyamide 6,6, polyamide 12 or mixtures of these polyamides;
(B) 15 to 30 parts by weight of a polyolefin onto which an unsaturated carboxylic acid or an unsaturated carboxylic acid derivative has been grafted and which has a density from about 0.921 to about 0.96 g/cm³, the degree of grafting being between about 0.01 and about 1 weight percent with respect to the entire grafted and ungrafted polyolefin;

(C) 10 to 20 parts by weight of a grafted polyolefin elastomer which includes, among others, ethylene and propylene units;

(D) additives selected from the group including stabilizers, anti-friction agents and fillers, with the sum of the parts by weight of components (A) to (D) being 100, and the mixture being produced by mixing components (A), (B) and (D) or (A), (B), (C) and (D) and extruding them at extruding rpm's from about 150 to about 300 rpm, preferably from 275 to 300 rpm.

The following examples are meant to describe the invention without limiting it.

I—COMPONENT (A)

In Comparison Examples 1 to 3 and in the example according to the invention, a nylon 6 having a relative viscosity of from about 3.0 to about 5.5 dl/g (1% polyamide solution in 98% sulfuric acid at 23° C.) was employed as the polyamide.

II—PRODUCTION OF COMPONENT (B)

In Comparison Examples 2 and 3 and in the example according to the invention, the grafted polyolefins were produced as follows:

Maleic acid anhydride and dicumyl peroxide were ground together in weight quantities of 1:0.1, with kaolin added as an adjuvant and were then compounded with the polyolefin. Quantity and type of the polyolefin employed in each case can be found in Table 1.

After mixing, the grafting reaction took place in the extruder under the following conditions:
temperatures of the extruder heating zones [°C.]: 100, 220, 250, 250, 260, 260
number of revolutions of the extruder [rpm]: 150

III—PRODUCTION OF THE POLYMER MIXTURES

In Comparison Examples 2 and 3 and in the example according to the invention, the mixture components were employed in the quantities listed in Table 2. Component (A) in the example according to the invention can contain anti-friction agents up to a maximum of about 1.5 weight percent, preferably up to 1.0 weight percent, as well as stabilizers (up to about 0.2 weight percent).

Components (A) and (B), or (A), (B) and (C), respectively, were mixed together and then extruded under the following conditions:
temperatures of the extruder heating zones [°C.]: 100, 260, 270, 270, 280, 280
number of revolutions of the extruder [rpm]: 50 to 300 rpm, particularly 275 to 300 rpm.

According to the invention, double-screw extruders (Werner & Pfleiderer Model ZSK 70) are used.

A functionalized polyolefin elastomer including ethylene, propylene and butene-1 units (trade name N-Tafmer (N-Tafmer MC 201), produced by Mitsui Petrochem. Ind.) was used as component (C).

IV—BARRIER CHARACTERISTICS

Permeation measurements were made on polymer bags produced in a blow molding process and having a volume of 210 ml. They were filled with approximately 30 g of the solvent to be measured, were tightly sealed, and then their weight loss at room temperature and at 35° C. was monitored over a period of four weeks. The results were annualized and are listed in Table 3 for Comparison Examples 1 to 3 and for the example according to the invention.

V—MECHANICAL PROPERTIES DURING INSTALLATION

To produce, for example, spray cans, polymer bags produced in a blow molding process are pushed into the opening of a metal can. Since the opening of the metal can is only 60% of the diameter of the polymer bag, the mechanical stress on the bag is very high when it is pushed in. Evaluation criteria are therefore the tightness of the bag after it is pushed in as well as the presence of permanent creases. The results of these tests made during the installation of polymer bags made of the mixture compositions of Comparison Examples 1 to 3 and according to the invention are compiled in Table 4, with the following evaluation being used:
good: tight and free of creases
insufficient: loose fit and/or with creases Another important criterion during installation is the possibility of being able to push in the polymer bag without prior conditioning and with good results. These results are also listed in Table 4.

Although, compared to pure nylon 6 (Comparison Example 1), the addition of polyolefin B-1 (Comparison Example 2) improves the barrier characteristics, the latter does not reach an acceptable level. Moreover, installability is entirely insufficient.

The addition of component (C) (polyolefin elastomer) (Comparison Example 3) provides good installability only after prior conditioning. However, the barrier values are still not sufficient.

The ternary mixture according to the invention used in Example 1, however, is easily processable and machineable and meets the requirements for barrier characteristics as well as installability. In addition, it is the only one which can be installed without prior conditioning.

TABLE 1

MIXTURE COMPONENT (B)

| Comparison Example | Example of Invention | Component B | Type of Polyolefin | Density [c/cm$^3$] | MFI* [g/10 min] | Maleic Acid Anhydride** [weight percent] |
|---|---|---|---|---|---|---|
| 2 | | B-1 | PE*** | 0.917–0.920 | 0.15–0.35 | 0.5 |
| 3 | | B-1 | PE | 0.917–0.920 | 0.15–0.35 | 0.5 |
| | 1 | B-2 | PE | 0.943–0.947 | 5.40–6.80 | 0.2 |

*melt flow index measured at 190° C. and 21.6 kg (DIN 53735/ISO 1133)
**with reference to the quantity of polyolefin
***PE = polyethylene

TABLE 2

COMPOSITION OF MIXTURE IN
WEIGHT QUANTITIES OF COMPONENTS (A) TO (C)

| Comparison Example | Example of Invention | A [weight percent] | B-1 [weight percent] | B-2 [weight percent] | C [weight percent] |
|---|---|---|---|---|---|
| 1 | | 100 | — | — | — |
| 2 | | 80 | 20 | — | — |
| 3 | | 65 | 25 | — | 10 |
|   | 1 | 60 | — | 25 | 15 |

TABLE 3

BARRIER CHARACTERISTICS OF THE POLYMER MIXTURES
(measured as weight loss of solvent*, annualized)

| Comparison Example | Example of Invention | Water [g/year] RT** | Water [g/year] 35° C. | Ethanol [g/year] RT | Ethanol [g/year] 35° C. | Pentane [g/year] RT | Pentane [g/year] 35° C. | Butane [g/year] RT | Butane [g/year] 35° C. |
|---|---|---|---|---|---|---|---|---|---|
| 1 | | 260 | 430 | 134 | 650 | 0.5 | 2.5 | —*** | — |
| 2 | | 8 | 210 | 12 | 570 | 0.05 | — | — | — |
| 3 | | 77 | 135 | 200 | 356 | 3.0 | 4.0 | — | — |
|   | 1 | 10 | 30 | 8 | 65 | — | — | 0.8 | 2.8 |

*30 g solvent in a polymer bag having a volume of 210 ml
**room temperature
***not measured

TABLE 4

INSTALLATION BEHAVIOR OF BLOW MOLDED
POLYMER BAGS PRODUCED OF DIFFERENT
POLYMER MIXTURES WHEN PUSHED INTO METAL CANS

| Polymer Mixture | Installation Without Conditioning | Installation Behavior* |
|---|---|---|
| Comparison Example 1 | no | good |
| Comparison Example 2 | no | insufficient |
| Comparison Example 3 | no | good |
| Example of Invention 1 | yes | good |

*insufficient = untight and/or with creases
good = tight and free of creases

It will be understood that the above description of the present invention is susceptible to various modifications, changes and adaptations, and the same are intended to be comprehended within the meaning and range of equivalents of the appended claims.

What is claimed is:

1. A flexible polyamide-containing polymer composition, having a melt viscosity of from about 1,000 to about 1,400 Pa·s at 270° C. and under a load of 122.6 N, said composition prepared from a mixture consisting of:
   (A) 50 to 75 parts by weight of polyamide 6, polyamide 6,6, polyamide 12 or mixtures of these polyamides;
   (B) 15 to 30 parts by weight of a polyolefin having a density of from about 0.921 to about 0.96 g/cm³ onto which an unsaturated carboxylic acid or an unsaturated carboxylic acid derivative has been grafted, the degree of grafting being between about 0.01 and about 1 weight percent with respect to the total weight of grafted and ungrafted polyolefin;
   (C) 10 to 20 parts by weight of a grafted polyolefin elastomer comprising ethylene and propylene units; and,
   (D) sufficient additives selected from the group including stabilizers, anti-friction agents and fillers, so that the sum of the parts by weight of components (A) to (D) of said mixture is 100,
   said mixture being extruded at from about 150 to about 300 rpm to produce a flexible polyamide-containing polymer composition.

2. The polyamide-containing polymer composition according to claim 1, having a melt viscosity of about 1,000 to about 1,200 Pa·s.

3. The polyamide-containing polymer composition according to claim 1, wherein component (D) comprises an anti-friction agent selected from the group consisting of stearates and polyethylene waxes or mixtures thereof.

4. The polyamide-containing polymer composition according to claim 1, wherein component (D) comprises an anti-friction agent in a quantity of from about 0.5 to about 1.5 weight percent compared to the total weight of the composition.

5. The polyamide-containing polymer composition according to claim 4, wherein component (D) comprises from about 0.5 to about 1.0 weight percent of at least one stearate from the group consisting of zinc stearate, aluminum stearate, steroyl stearate, and from 0 to about 0.5 weight percent of a polyethylene wax.

6. The polyamide-containing polymer composition according to claim 1, wherein the degree of grafting of component (B) is from about 0.025 to about 0.5 weight percent, with respect to the polyolefin percentage.

7. The polyamide-containing polymer composition according to claim 1, comprising 60 to 65 parts by weight of component (A), 20 to 35 parts by weight of component (B) and 15 to 20 parts by weight of component (C).

8. The polyamide-containing polymer composition according to claim 1, wherein the polyamide component (A) has a relative viscosity of from about to about 5.5 dl/g, measured as a 1% solution in 98% sulfuric acid at 23° C.

9. The polyamide-containing polymer composition according to claim 1, wherein the polyolefin of component (B) has a density of from about 0.94 to about 0.95 g/cm³ prior to grafting.

10. The polyamide-containing polymer composition according to claim 1, wherein the polyolefin of component (B) is polyethylene.

11. The polyamide-containing polymer composition according to claim 10, wherein prior to grafting, the polyethylene has a melt index of from about 1 to about 20 g/10 min at 190° C. and under a load of 21.6 kg.

12. The polyamide-containing polymer composition according to claim 11, wherein an unsaturated carboxylic acid or a carboxylic acid derivative is grafted onto from about 40 to about 100 weight percent of the polyethylene.

13. The polyamide-containing polymer composition according to claim 1, wherein the unsaturated carboxylic acid derivative is maleic acid anhydride and is employed in quantities of about 0.01 to about 1.0 weight percent, with respect to the weight percentage of polyolefin.

14. The polyamide-containing polymer composition according to claim 1, wherein the grafted polyolefin elastomer component (C) comprises ethylene, propylene and butene-1 units.

15. A shaped object that can be produced by means of injection molding, extruding, coextruding, blow molding or reshaping, wherein the shaped object comprises the polyamide-containing polymer composition according to claim 1.

16. The shaped object according to claim 15, wherein the shaped object is a blow molded bag which constitutes the inner layer of a container comprising an outer layer and an inner layer with a propellant disposed therebetween, as well as a valve.

17. The shaped object according to claim 16, wherein the outer layer of said container is made of metal.

18. The shaped object according to claim 16, wherein the propellant comprises at least one alkane having three to five carbon atoms.

19. The polyamide-containing polymer composition according to claim 1, the composition being produced by mixing components (A), (B), (C) and (D) prior to extrusion.

20. The polyamide-containing polymer composition according to claim 1, the composition being produced by mixing components (A), (B) and (D), extruding said mixed components to form an extrudate, and subsequently mixing component (C) into said extrudate.

* * * * *